United States Patent
Rzepecki (10) Patent No.: US 10,297,075 B2
(45) Date of Patent: May 21, 2019

(54) METHOD OF PROCESSING IMAGE DATA

(71) Applicant: Arm Limited, Cambridge (GB)

(72) Inventor: Jaroslaw Rzepecki, Cambridge (GB)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 15/709,184

(22) Filed: Sep. 19, 2017

(65) Prior Publication Data
US 2019/0088012 A1    Mar. 21, 2019

(51) Int. Cl.
G06T 17/00 (2006.01)
G06T 17/10 (2006.01)
G06T 7/50 (2017.01)
G06T 17/20 (2006.01)

(52) U.S. Cl.
CPC ........... *G06T 17/10* (2013.01); *G06T 7/50* (2017.01); *G06T 17/20* (2013.01); *G06T 2207/10028* (2013.01); *G06T 2215/16* (2013.01)

(58) Field of Classification Search
CPC ................................. G06T 17/00; G06T 15/04
USPC ........................................................... 345/420
See application file for complete search history.

(56) References Cited

U.S. PATENT DOCUMENTS

| 7,812,850 B1* | 10/2010 | Nelson | G06T 11/60 345/420 |
| 2001/0029440 A1* | 10/2001 | Kondo | G06T 17/20 703/2 |
| 2004/0027358 A1* | 2/2004 | Nakao | G06T 11/40 345/587 |

* cited by examiner

*Primary Examiner* — Thomas J Lett
(74) *Attorney, Agent, or Firm* — EIP US LLP (57) ABSTRACT

Examples of the present disclosure relate to methods for processing image data comprising data corresponding to a three-dimensional object. One such method comprises determining a plurality of polygons, the polygons being representative of the three-dimensional object, wherein each polygon has associated geometric information. At least one polygon group is formed from the plurality of polygons, said polygon group comprising polygons with correlated geometric information. At least one geometric primitive is determined for said polygon group, the geometric primitive corresponding to polygons of said polygon group. Data is output, representing said geometric primitive as at least a part of a representation of the three-dimensional object.

15 Claims, 7 Drawing Sheets

METHOD OF PROCESSING IMAGE DATA

BACKGROUND OF THE INVENTION

Field of the Invention

The present invention relates to methods, apparatus, and computer readable storage media for processing image data.

Description of the Related Technology

Different methods exist for representing a three-dimensional object in image data, for example image data produced by three-dimensional scanning or other sensing of the object. In many such methods the object is represented by way of a set of polygons, for example triangles, approximating the surface of the object.

Figure 1:
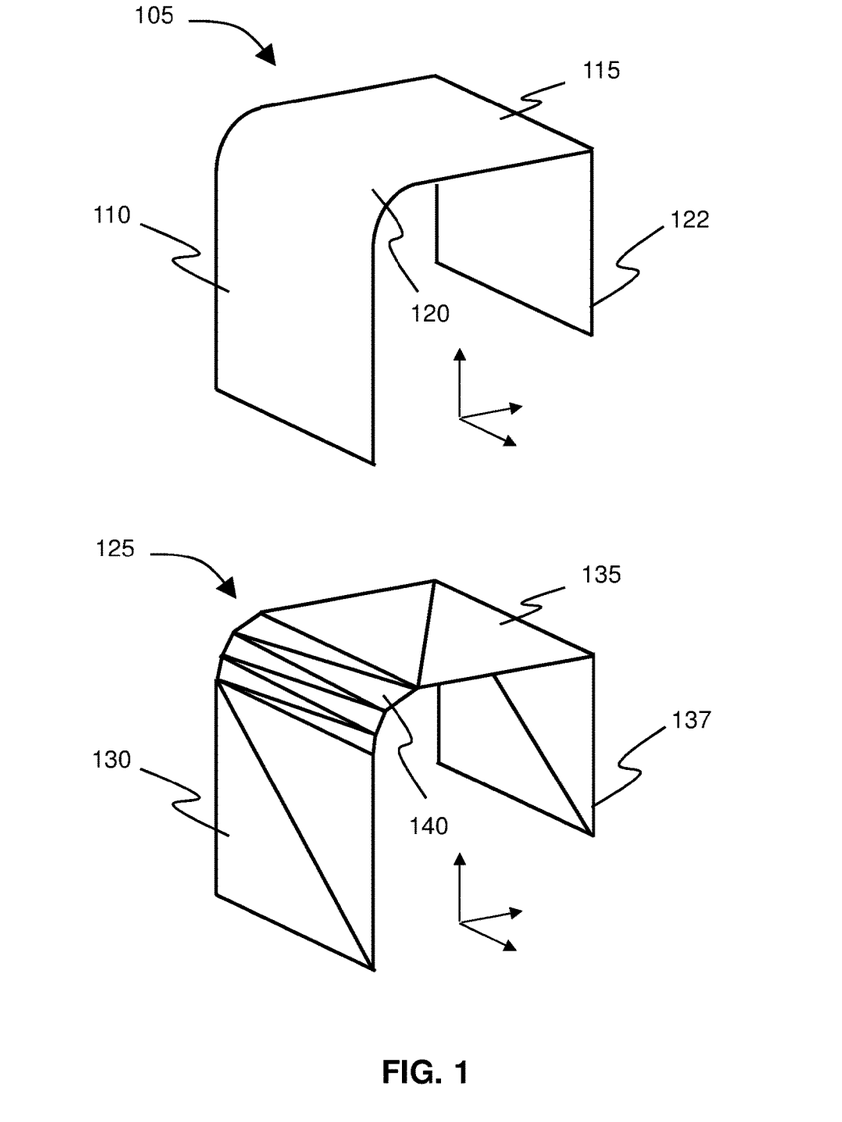
FIG. 1 shows an example of a representation of a three-dimensional object.

FIG. 1 shows an example of such a representation. A three-dimensional object 105 is shown in an isometric view. The object 105 has the form of a thin sheet comprising two planar portions 110, 115 joined by a curved portion 120. One of the planar portions 115 is joined at a right angle by a third planar portion 122.

The object 105 can be presented as a set of polygons 125. The polygons form a mesh, approximating the shape of the object 105. In flat regions 130, 135, 137, a relatively small number of polygons can accurately represent the corresponding region 110, 115, 122 of the object 105. However, in the curved region 140, a greater density of polygons is required to approximate the shape of the corresponding region 120 of the object 105.

In order to accurately represent a complex object that is not primarily composed of flat surfaces, such as for example a tree or a person, a very large number of polygons are typically required. Significant computing resources are required to store and process such image data.

The required computing resources can be reduced by reducing the number of polygons used to represent the object, such that polygons of larger size are used. This negatively impacts the accuracy of the approximation of the object's surface and can cause artefacts, whereby the three-dimensional object is visibly formed from a mesh of polygons.

There is thus a need for methods to accurately represent three-dimensional objects whilst allowing efficient storing and processing of the representation.

SUMMARY

According to a first aspect of the present invention, there is provided a method for processing image data comprising data corresponding to a three-dimensional object. The method comprises: determining a plurality of polygons, the polygons being representative of the three-dimensional object, wherein each polygon has associated geometric information; forming, from the plurality of polygons, at least one polygon group, said polygon group comprising polygons with correlated geometric information; determining, for said polygon group, at least one geometric primitive corresponding to polygons of said polygon group; and outputting data representing said geometric primitive as at least a part of a representation of the three-dimensional object.

The three-dimensional object can therefore be represented in terms of geometric primitives. This is more efficient, both in terms of storing and of processing the representation, than a representation in terms of polygons. There is thus a reduction in the required storage and processing resources.

In some examples, determining said geometric primitive for said polygon group comprises: determining a geometric primitive indicator associated with each polygon of the given polygon group; and determining said geometric primitive based on at least one said geometric primitive indicator. This allows polygons to be extrapolated into respective geometric primitives that are indicated by the polygons. The determined geometric primitive can then be based on the extrapolated geometric primitives.

In one such example, the method comprises: forming at least one indicator group from the determined geometric primitive indicators, the indicator group comprising correlated geometric primitive indicators; and determining said geometric primitive based on the geometric primitive indicators of one of said indicator groups. Such binning of geometric primitive indicators into groups within a given polygon group allows a geometric primitive to be determined based on a group of geometric primitive indicators that each indicate a similar geometric primitive.

In some examples, each geometric primitive indicator has at least one associated value. Each indicator group of the at least one indicator group comprises geometric primitive indicators with associated values in a predefined range. This allows efficient assigning of geometric primitive indicators into a given group. The size of the predefined range can be optimized in a trade-off between the amount of data required to store the representation of the three-dimensional image, and the quality of the representation.

In some examples, the image data is derived using a process comprising sensing a scene comprising the three-dimensional object. This may comprise three-dimensionally scanning the three-dimensional object. Alternatively or additionally, this may comprise determining a two-dimensional image of the scene and determining depth information associated with scene. Such methods allow efficient representation of real-world three-dimensional objects based on sensor inputs.

In an example, the method comprises determining a point cloud associated with the three-dimensional object and determining the plurality of polygons from points of the point cloud. This allows determination of the polygons, and thus determination of the representation of the object in terms of geometric primitives, based only on a distribution of points associated with the object. For example, at least some of the points may be located on the surface of the object.

In some examples, the method comprises: determining, for said polygon group, at least one further geometric primitive corresponding to polygons of said polygon group; and outputting data representing said further geometric primitive as a further part of the representation of the three-dimensional object. This process can then be repeated. The representation of the portion of the object corresponding to the polygon group in question may thus be formed from a number of geometric primitives.

Alternatively or additionally, the method may comprise: determining, for a further polygon group of the at least one polygon group, at least one further geometric primitive corresponding to polygons of said polygon group; and outputting data representing said further geometric primitive as a further part of the representation of the three-dimensional object. These steps can be repeated. The various polygon groups can thus each be represented by one or more geometric primitives.

In examples, said geometric information comprises at least one geometric information value. The correlation of geometric information of polygons of a given polygon group of the at least one polygon group may then be such that each polygon of the given polygon group has a geometric information value within a predefined range of a corresponding geometric information value of at least one further polygon of the given polygon group. The magnitude of the predefined range can be set to define the degree of difference that is permitted between two polygons in the same polygon group. The geometric information of a given polygon may comprise at least one of a position and a direction associated with at least one vertex of the given polygon.

According to a further aspect of the present disclosure, there is provided an apparatus for processing image data comprising data corresponding to a three-dimensional object. The apparatus comprises: a receiver configured to receive the image data; and a processor configured to: determine a plurality of polygons, the polygons being representative of the three-dimensional object, wherein each polygon has associated geometric information; form, from the plurality of polygons, at least one polygon group, said polygon group comprising polygons with correlated geometric information; determine, for said polygon group, at least one geometric primitive corresponding to polygons of said polygon group; and output data representing said geometric primitive as at least a part of a representation of the three-dimensional object.

In some examples, the apparatus comprises a further processor configured to: determine, for said polygon group, at least one further geometric primitive corresponding to polygons of said polygon group; and output data representing said geometric primitive as at least a further part of the representation of the three-dimensional object.

According to a further aspect of the present disclosure, there is provided a non-transitory computer-readable storage medium comprising a set of computer-readable instructions stored thereon which, when executed by at least one processor, cause the at least one processor to process image data comprising data corresponding to a three-dimensional object to: determine a plurality of polygons, the polygons being representative of the three-dimensional object, wherein each polygon has associated geometric information; form, from the plurality of polygons, at least one polygon group, said polygon group comprising polygons with correlated geometric information; determine, for said polygon group, at least one geometric primitive corresponding to polygons of said polygon group; and output data representing said geometric primitive as at least a part of a representation of the three-dimensional object.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 2:
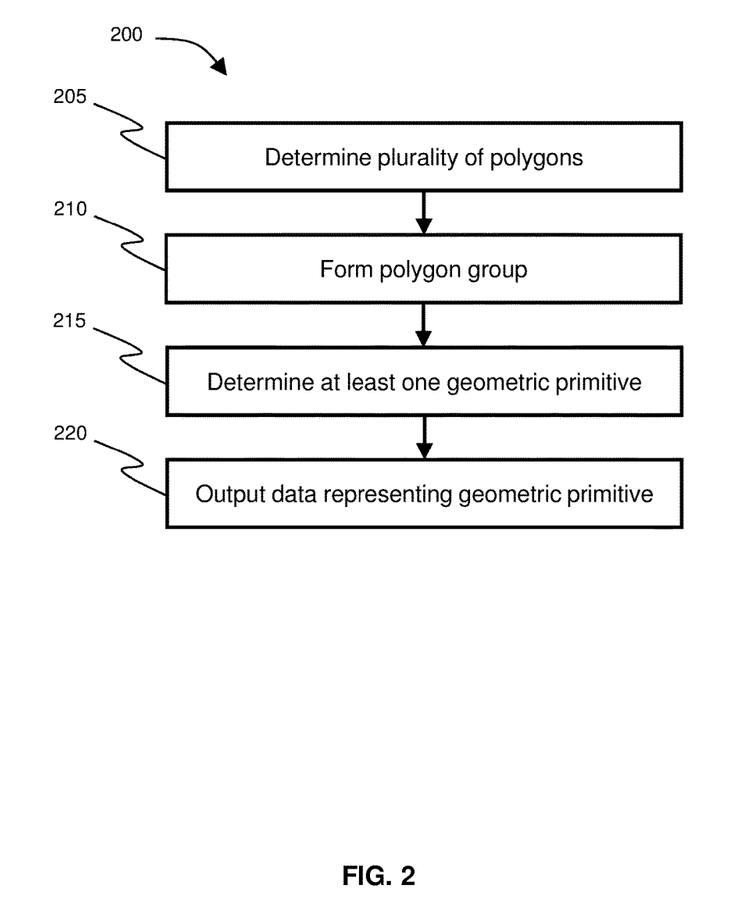
FIG. 2 shows a schematic representation of a method for processing image data.

FIG. 2 shows a schematic representation of a method 200 for processing image data comprising data corresponding to a three-dimensional object, according to an aspect of the present disclosure.

The method 200 comprises a step 205 of determining a plurality of polygons. The polygons are representative of the three-dimensional object, as described above in relation to FIG. 1. In some examples, the method comprises determining a set of points, which may be termed a point cloud, associated with the three-dimensional object. The plurality of polygons can then be determined from points of the point cloud. For example, sets of three nearby points may be randomly connected to form a set of triangles.

In some examples, the image data is derived using a process comprising sensing a scene comprising the three-dimensional object. For example, sensing the scene may comprise three-dimensionally scanning the three-dimensional object. Alternatively or additionally, sensing the scene may comprise determining the shape of the three-dimensional object by combining a two-dimensional image of the object with depth information. For example, a typical automated vehicle combines the outputs of various sensors, including two-dimensional cameras and depth sensors, to form a three-dimensional representation of the surrounding scene. The plurality of polygons can be determined as a representation of the sensed scene.

In other examples, the image data is derived by way of three-dimensional solid modelling methods. For example, a three-dimensional model constructed using such a method can be converted into a mesh of polygons.

Each polygon has associated geometric information. The geometric information of a given polygon describes the geometry of that polygon. For example, the geometric information may include the three-dimensional position of each vertex of the polygon.

The method 200 comprises a step 210 of forming, from the plurality of polygons, at least one polygon group. Said polygon group comprises polygons with correlated geometric information. For example, as will be described in more detail below, a given polygon group may comprise polygons that are located adjacently, or near to each other, and/or that have similar orientations.

The method 200 then comprises a step 215 of determining, for said polygon group, at least one geometric primitive corresponding to polygons of said polygon group. A geometric primitive is a fundamental, typically simple three-dimensional shape or volume, from which more complex objects can be constructed. Examples of geometric primitives can include cubes, cylinders, spheres, planes, cones, pyramids and tori, and segments or portions thereof.

The method 200 comprises a step 220 of outputting data representing said geometric primitive as at least a part of a representation of the three-dimensional object. The three dimensional object can thus be represented in terms of geometric primitives, the shape of the combined geometric primitives approximating the shape of the object. A given geometric primitive can typically be represented more efficiently than the combined polygons from which that primitive is determined. The efficiency of representing the object is thus improved.

The method also allows the surface to be parametrized, i.e. for the shape of the surface to be described by a series of parameters, based on the geometric primitives. Similarly, the method can be used to "correct" the shape of a polygon mesh, based on an assumption that the mesh is based on an underlying smooth shape. For example, a group of polygons approximating a sphere can be represented by an exactly spherical geometric primitive.

An example of forming polygon groups, as performed in step 210 of the method 200, will now be described with reference to FIGS. 3A and 3B.

Figure 3A:
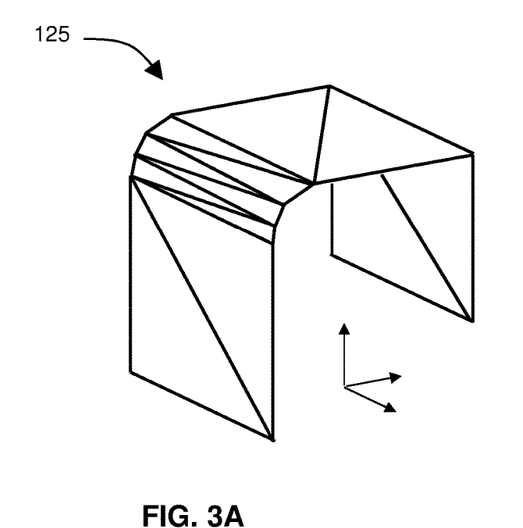
FIGS. 3A and 3B show an example of forming groups of polygons.

FIG. 3A shows a plurality of polygons 125 that are representative of a three-dimensional object, as described above in relation to FIG. 1. As described above, each polygon has associated geometric information. The geometric information comprises at least one geometric information value. An example geometric information value is the location, for example expressed as three-dimensional co-ordinates, of each vertex of a given polygon. Another example geometric information value is a direction and/or magnitude of a vector associated with each vertex of a given polygon. An example of such a vector is a normal vector, oriented perpendicular to the surface of the three-dimensional object. Such vectors may be used to describe aspects of the surface, such as the curvature, more accurately than would be possible by way of the vertices alone.

As noted above, polygon groups comprise polygons with correlated geometric information. In examples, the correlation of geometric information of polygons of a given polygon group is such that each polygon of the given polygon group has a geometric information value within a predefined range of a corresponding geometric information value of at least one further polygon of the given group.

In the present example, two polygons are assigned to the same polygon group if a vertex of one polygon has approximately the same position, and normal vector, as a vertex of the other polygon. For example, two polygons may be assigned to the same polygon group if the position and/or normal vector direction of a vertex of one polygon is within a predefined range of the corresponding parameter of a vertex of another polygon. A given polygon group thus includes polygons corresponding to a flat, or smoothly curved, area of the object 105. Such a group may be termed a smoothing group. In other examples, two polygons are assigned to the same polygon group if two vertices of one polygon have approximately the same position as two vertices of the other polygon, i.e. if the two polygons share an edge.

Figure 3B:
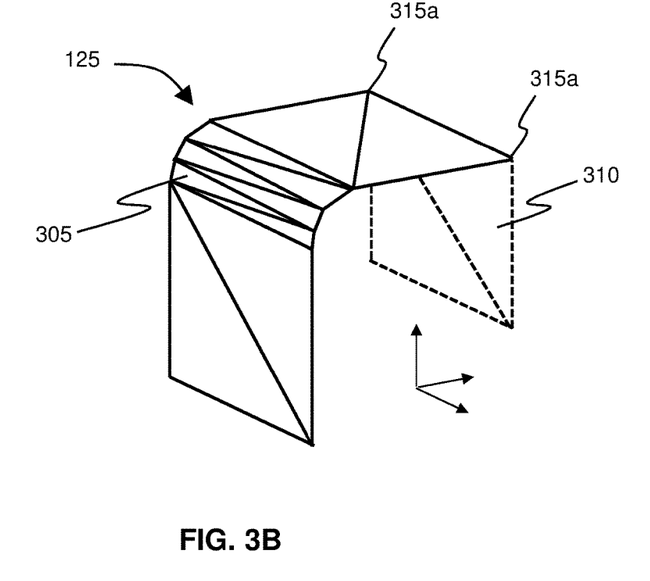

FIG. 3B shows a polygon group 305 (solid lines) formed from polygons corresponding to the curved portion 120 of the object 105, and the planar portions 110, 115 that adjoin the curved portion 120. A second polygon group 310 (dashed lines) comprises the polygons corresponding to the third planar portion 122 that is joined by a right angle to the planar portion 115. The polygons of the second group share 310 vertices 315*a*, 315*b* with polygons of the first group 305. However, because of the right angle between the polygons of the second group 310 and the adjacent polygons of the first group 305, the normal vectors associated with the vertices of the polygons of the second group 310 are perpendicular to the normal vectors associated with the vertices of the polygons of the first group 305. As such, the polygons of the plurality 125 are assigned to first and second groups 305, 310 as shown in FIG. 3B.

As noted above, at least one geometric primitive is determined for a given polygon group at step 215 of method 200. In an example, determining such a geometric primitive for a given polygon group comprises determining a geometric primitive indicator associated with each polygon of the given group. A geometric primitive indicator indicates a geometric primitive extrapolated from a given polygon. For example, a plane may be extrapolated from a polygon, such that the polygon lies within that plane. The geometric primitive can then be determined based on such geometric primitive indicators. For example, multiple geometric primitive indicators may indicate a similar geometric primitive. The output geometric primitive can then be based on an average of these.

Example methods for determining a geometric primitive indicator from a polygon, in this case a triangle, will now be described with reference to FIGS. 4A to 4C. In each example, a geometric primitive indicator is determined from positions and normal vector directions associated with two vertices of the triangle. The two vertices may be randomly selected. In other examples, a geometric primitive indicator is determined from all three vertices of a given triangle.

Figure 4A:
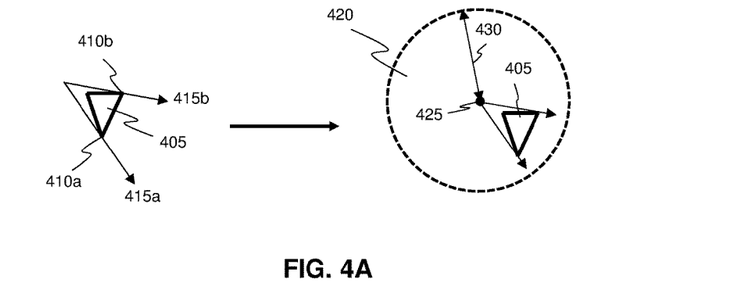
FIGS. 4A to 4C show example methods of determining a geometric primitive indicator from a polygon.

FIG. 4A shows a triangle 405. A first vertex of the triangle 405 has position 410*a* and an associated normal vector direction 415*a*. A second vertex of the triangle 405 has position 410*b* and an associated normal vector direction 415*b*. The normal vector directions 415*a*, 415*b* are not parallel.

A geometric primitive indicator corresponding to the triangle 405 indicates a sphere 420 (dashed lines). The sphere 420 has a central origin 425 determined as the intersection of a line defined by the position 410*a* and normal vector direction 415*a* of the first vertex and a line defined by the position 410*b* and normal vector direction 415*b* of the second vertex. The sphere 420 has a radius 430 determined as the average of the distance between the origin 425 and the position 410*a* of the first vertex and the distance between the origin 425 and the position 410*b* of the second vertex.

The sphere 420 can be fully described by the origin 425 location and the radius 430.

Figure 4B:
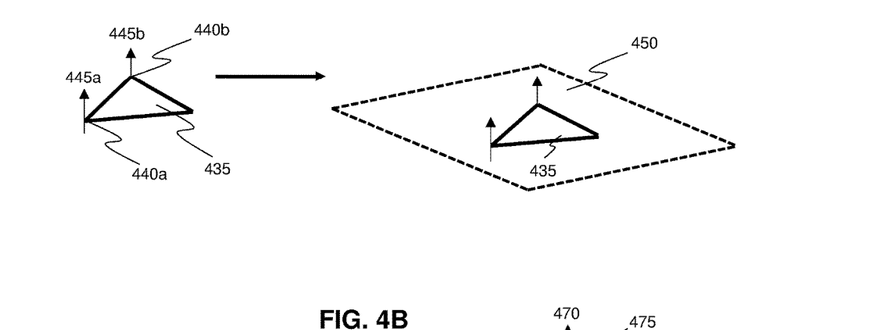

FIG. 4B shows a triangle 435. A first vertex of the triangle 435 has position 440*a* and an associated normal vector direction 445*a*. A second vertex of the triangle 435 has position 440*b* and an associated normal vector direction 445*b*. The normal vector directions 445*a*, 445*b* are approximately parallel.

A geometric primitive indicator corresponding to the triangle 435 indicates a plane 450. The plane 450 is determined as intersecting the positions 440*a*, 440*b* of the first and second vertices and having a normal equal to the average of the normal vector directions 445*a*, 445*b* of the first and second vertices.

The plane 450 can be fully described by the normal and the position of a single point in the plane.

Figure 4C:
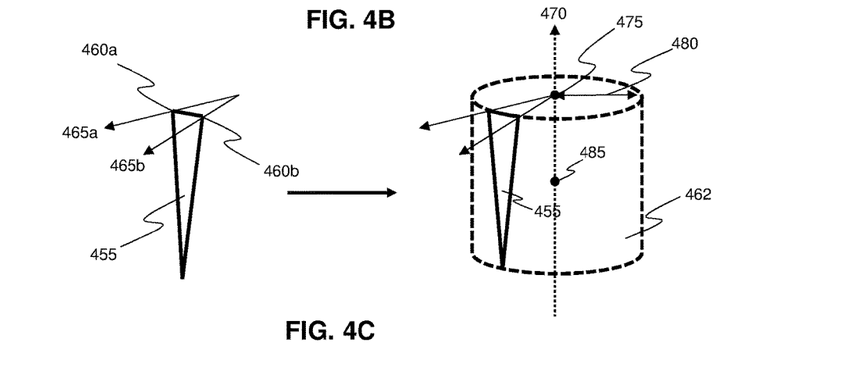

FIG. 4C shows a triangle 455. A first vertex of the triangle 455 has position 460*a* and an associated normal vector direction 465*a*. A second vertex of the triangle 455 has position 460*b* and an associated normal vector direction 465*b*. The normal vector directions 465*a*, 465*b* are not parallel.

A geometric primitive indicator corresponding to the triangle 455 indicates a cylinder 462. The cylinder 462 has a central axis 470 with a direction determined as a vector product or cross product of the normal vector direction 465*a* of the first vertex and the normal vector direction 465*b* of the second vertex. The position of the central axis is determined as the position of intersection 475 of a line defined by the position 460a and normal vector direction 465a of the first vertex and a line defined by the position 460b and normal vector direction 465b of the second vertex. The cylinder has a radius 480 determined as the average of the distance between the intersection position 475 and the position 460a of the first vertex and the distance between the intersection position 475 and the position 460b of the second vertex.

It may be desirable to determine a central origin 485 of the cylinder 462. In order to do this, a bounding sphere of the polygon group can be determined. For example, this may be the smallest possible sphere that includes the entire polygon group. The central axis intersects this sphere in two positions. The central origin 485 can then be determined as the point half way between these positions.

The cylinder 465 can be fully described by the direction of the central axis 470, the radius 480, and the position of either the intersection point 475 or the central origin 485.

An example of determining at least one geometric primitive from geometric primitive indicators will now be described with reference to FIGS. 5A and 5B.

In other examples, a geometric primitive indicator is determined from a pair of polygons of a polygon group, which may for example be randomly selected from the group. For example, an average vertex position may be determined for each polygon, and an average normal vector direction may be determined for each polygon. The corresponding geometric primitive indicator can then be determined from these average vertex positions and normal vector directions.

Figure 5A:
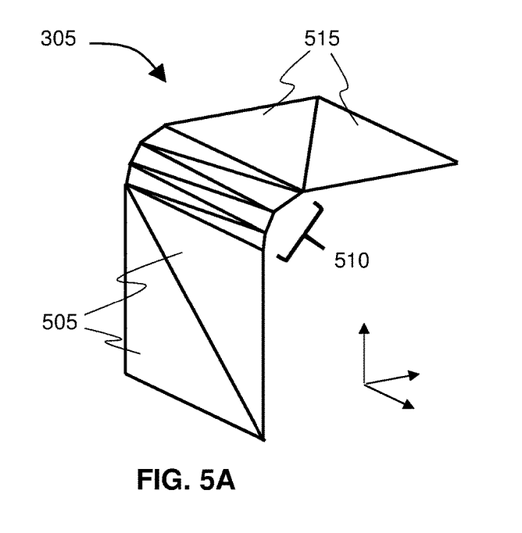
FIGS. 5A and 5B show an example of determining geometric primitives from a group of polygons.

FIG. 5A shows the polygons of a polygon group 305 as described above in relation to FIG. 3B. Geometric primitive indicators are determined for each polygon of the group 305.

Polygons 505 correspond to a planar region 110 of the three-dimensional object 105. Geometric primitive indicators determined from each of these polygons 505 thus indicate the same plane.

Polygons 510 correspond to a curved region 120 of the three-dimensional object 105. This region is shaped approximately as a segment of a cylinder. Geometric primitive indicators determined from each of these polygons 510 thus indicate approximately the same cylinder. Although a geometric primitive indicator indicating, for example, a sphere, could be determined for each polygon 510, the indicators of each polygon 510 would indicate different spheres and not the same sphere.

Polygons 515 correspond to a second planar region 115 of the three-dimensional object. Geometric primitive indicators determined from each of these polygons 515 thus indicate the same plane.

At least one indicator group is formed from the determined geometric primitive indicators. The indicator group comprises correlated geometric primitive indicators. In this example, the correlation is such each indicator of a given group indicates approximately the same geometric primitive. Accordingly, a first indicator group is formed from the indicators determined from the polygons 505 of the first planar region, a second indicator group is formed from the indicators determined from the polygons 510 of the curved region, and a third indicator group is formed from the polygons 515 of the second planar region.

In some examples, each geometric primitive indicator has at least one associated value. For example, a geometric primitive indicator indicating a plane can have values of a normal direction of the plane and a position of a point in the plane. As described above, these two values are sufficient to fully describe a plane. Each indicator group may then comprise indicators with associated values in a predefined range. This range may be defined relative to values of other indicators in the indicator group. For example, an indicator may be added to a group if each of its associated values are within predefined ranges of corresponding values of at least one other indicator in the indicator group. Similarly, values of geometric primitive indicators may be discretized with a predefined precision. A geometric primitive indicator group can then be formed from geometric primitives that have the same values following such discretization.

A geometric primitive is then determined based on the geometric primitive indicators of each indicator group. This geometric primitive may have values equal to an average of the corresponding values of the indicators in that indicator group. For example, where each indicator of the indicator group indicates a sphere with similar origin position and radius, the determined geometric indicator may have an origin position equal to the average origin position of the indicators of the indicator group, and a radius equal to the average radius of the indicators of the indicator group. The method can then comprise similarly determining at least one further geometric primitive corresponding to polygons of the polygon group. In some examples, geometric primitive indicators are only formed from indicator groups comprising at least a minimum number of indicators, for example six indicators, or 4% of the indicators determined for the entire polygon group.

Figure 5B:
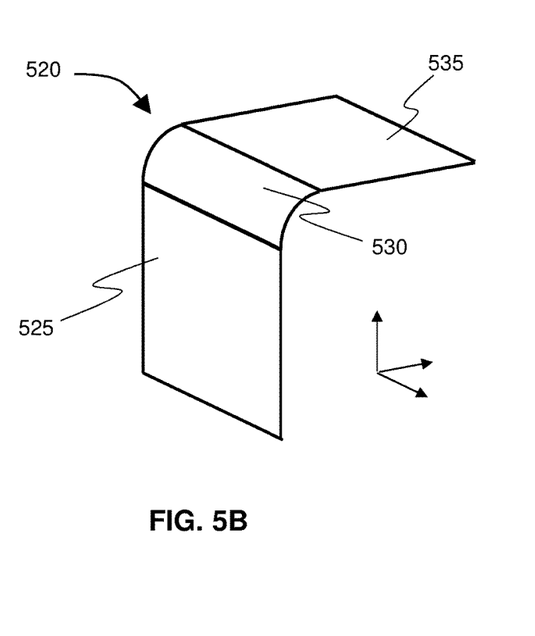

FIG. 5B shows a representation 520 of the three dimensional object, formed from geometric primitives determined from the indicator groups described above in relation to FIG. 5A. A first geometric primitive is a plane 525 determined from the indicator group corresponding to polygons 505 of the first planar region. A second geometric primitive is a segment of a cylinder 530 determined from the polygons 510 of the curved region. A third geometric primitive is a plane 535 determined from the polygons 515 of the second planar region.

Data representing the geometric primitives is then output, as at least part of a representation of the three-dimensional object.

The description above has related to a single polygon group 305. The process can be repeated for one or more further polygon groups, to form representations of additional portions of the three-dimensional object.

A three-dimensional object described as a mesh of a large number of polygons can thus be represented by a relatively small number of geometric primitives, thereby improving the efficiency of storing and processing image data. The number of operations required to perform the method scales linearly with the number of polygons in the mesh. As such, the method remains efficient even for meshes of arbitrarily large numbers of polygons.

The number of geometric primitives can be reduced by loosening the requirements for two indicators to be assigned to the same indicator group, such that each group comprises a greater number of indicators which indicate a wider range of geometric primitives. As this wider range is represented by a single determined geometric primitive, this reduces the size of the output whilst also reducing the accuracy of representation of the three-dimensional object.

Conversely, the requirements for two indicators to be assigned to the same indicator group can be tightened, such that each group comprises a smaller number of indicators which indicate a narrow range of geometric primitives. This increases the overall number of output geometric primitives, which increases the size of the output and also increases the accuracy of representation of the three-dimensional object.

Figure 6:
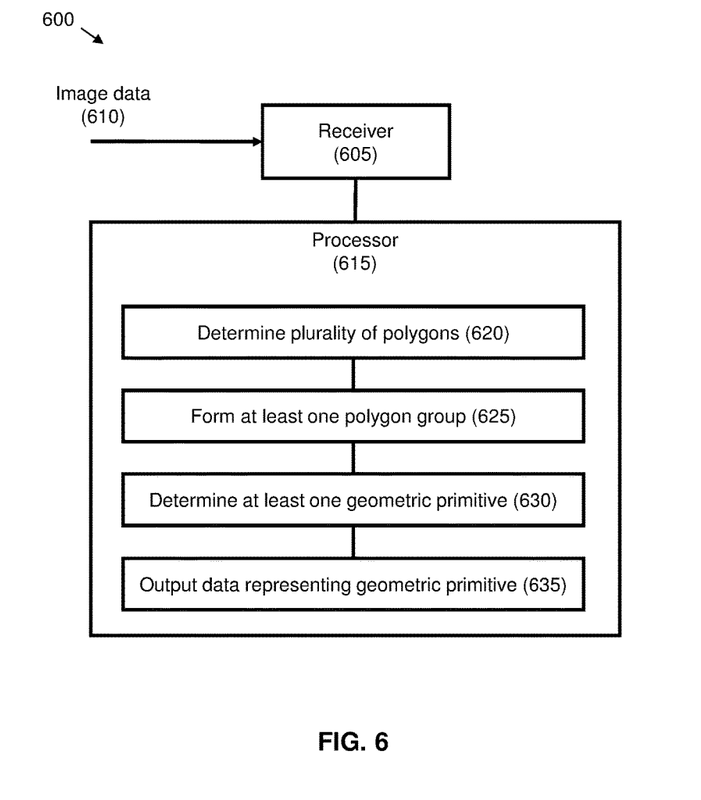
FIG. 6 shows a schematic example of an apparatus for processing image data.

FIG. 6 shows a schematic representation of an apparatus 600 for processing image data comprising data corresponding to a three-dimensional object, for example by performing a method as described above. The apparatus may for example be implemented by dedicated hardware, such as an application-specific integrated circuit. In other examples, the apparatus is implemented in general purpose hardware, for example as software executed by a general purpose computer. In some embodiments, the apparatus forms a component of an imaging system such as a camera.

The apparatus 600 comprises a receiver 605 configured to receive the image data 610.

The apparatus 600 comprises a processor 615. The processor 615 is configured to, at block 620, determine a plurality of polygons. The polygons are representative of the three-dimensional object. Each polygon has associated geometric information.

The processor 615 is configured to, at block 625, form, from the plurality of polygons, at least one polygon group. Said polygon group comprises polygons with correlated geometric information.

The processor 615 is configured to, at block 630, determine, for said polygon group, at least one geometric primitive corresponding to polygons of said polygon group.

The processor 615 is configured to, at block 635, output data representing said geometric primitive as at least a part of a representation of the three-dimensional object.

The methods described above allow aspects of the process of determining the geometric primitives to be performed in parallel, by different processors or by different cores of the same processor. For example, processing of different polygon groups, or different indicator groups, or individual polygons, can be performed in parallel. As an example, the processor may be an element of a central processing unit or graphics processing unit that is optimized for multi-threaded parallel processing. As another example, the method may be performed by a network of processors such as a server farm or a distributed computing grid. The required processing may thus be shared efficiently across a parallelized system.

Figure 7:
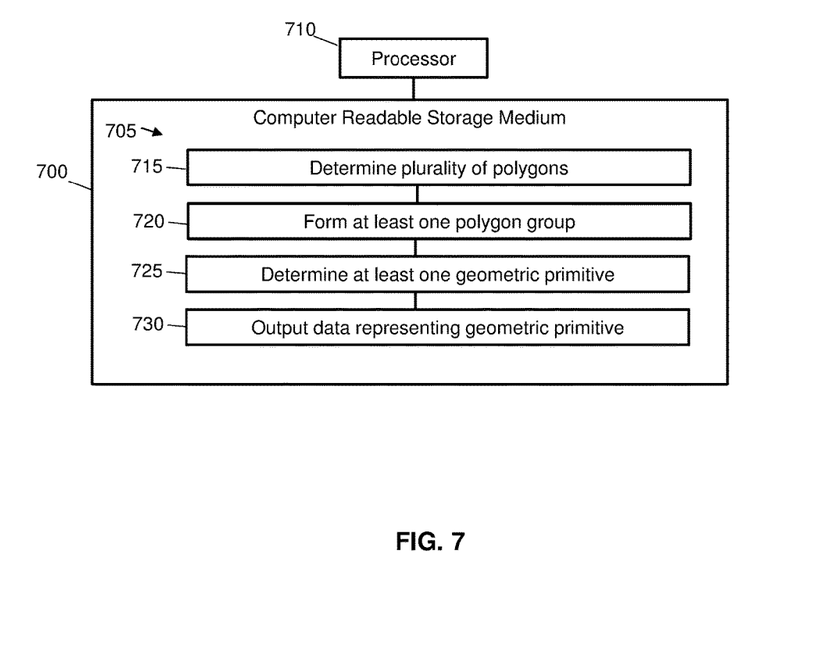
FIG. 7 shows a schematic example of a non-transitory computer-readable storage medium.

In some such examples, the apparatus 615 comprises a further processor. The further processor is configured to, for said polygon group, determine at least one further geometric primitive corresponding to polygons of said polygon group. The further processor is configured to then output data representing said geometric primitive FIG. 7 shows an example of a non-transitory computer-readable storage medium 700 comprising a set of computer readable instructions 705 which, when executed by at least one processor 710, cause the at least one processor 710 to perform a method of processing image data comprising data corresponding to a three-dimensional object according to examples described herein. The computer readable instructions 705 may be retrieved from machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

At block 715, the instructions 705 cause the processor 710 to determine a plurality of polygons, the polygons being representative of the three-dimensional object, wherein each polygon has associated geometric information.

At block 720, the instructions 705 cause the processor 710 to form, from the plurality of polygons, at least one polygon group, said polygon group comprising polygons with correlated geometric information;

At block 725, the instructions 705 cause the processor 710 to determine, for said polygon group, at least one geometric primitive corresponding to polygons of said polygon group.

At block 730, the instructions 705 cause the processor 710 to output data representing said geometric primitive as at least a part of a representation of the three-dimensional object.

The above embodiments are to be understood as illustrative examples of the invention. Further embodiments of the invention are envisaged. For example, the method may be performed in real time by an automated vehicle to produce a representation of the scene surrounding the vehicle. The generated geometric primitives may be efficiently processed to allow the vehicle to determine the extent of obstacles in the vicinity, and then maneuver to avoid such obstacles. In another example, the generated geometric primitives can be used to detect collisions between simulated three-dimensional objects.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for processing image data comprising data corresponding to a three-dimensional object, the method comprising:
    determining a plurality of polygons, the polygons being representative of the three-dimensional object, wherein each polygon has associated geometric information;
    forming, from the plurality of polygons, at least one polygon group, said polygon group comprising polygons with correlated geometric information;
    determining, for said polygon group, at least one geometric primitive corresponding to polygons of said polygon group; and
    outputting data representing said geometric primitive as at least a part of a representation of the three-dimensional object.

2. The method of claim 1, wherein determining said geometric primitive for said polygon group comprises:
    determining a geometric primitive indicator associated with each polygon of the given polygon group; and
    determining said geometric primitive based on at least one said geometric primitive indicator.

3. The method of claim 2, comprising:
    forming at least one indicator group from the determined geometric primitive indicators, the indicator group comprising correlated geometric primitive indicators; and
    determining said geometric primitive based on the geometric primitive indicators of one of said indicator groups.

4. The method of claim 3, wherein:
    each geometric primitive indicator has at least one associated value; and
    each indicator group of the at least one indicator group comprises geometric primitive indicators with associated values in a predefined range.

5. The method of claim 1, wherein the image data is derived using a process comprising sensing a scene comprising the three-dimensional object.

6. The method of claim 5, wherein sensing the scene comprises three-dimensionally scanning the three-dimensional object.

7. The method of claim 5, wherein sensing the scene comprises:
determining a two-dimensional image of the scene; and
determining depth information associated with scene.

8. The method of claim 1, comprising:
determining a point cloud associated with the three-dimensional object; and
determining the plurality of polygons from points of the point cloud.

9. The method of claim 1, comprising:
determining, for said polygon group, at least one further geometric primitive corresponding to polygons of said polygon group; and
outputting data representing said further geometric primitive as a further part of the representation of the three-dimensional object.

10. The method of claim 1, comprising:
determining, for a further polygon group of the at least one polygon group, at least one further geometric primitive corresponding to polygons of said polygon group; and
outputting data
representing said further geometric primitive as a further part of the representation of the three-dimensional object.

11. The method of claim 1, wherein:
said geometric information comprises at least one geometric information value; and
the correlation of geometric information of polygons of a given polygon group of the at least one polygon group is such that each polygon of the given polygon group has a geometric information value within a predefined range of a corresponding geometric information value of at least one further polygon of the given polygon group.

12. The method of claim 1, wherein the geometric information of a given polygon comprises at least one of a position and a direction associated with at least one vertex of the given polygon.

13. An apparatus for processing image data comprising data corresponding to a three-dimensional object, the apparatus comprising:
a receiver configured to receive the image data; and
a processor configured to:
determine a plurality of polygons, the polygons being representative of the three-dimensional object, wherein each polygon has associated geometric information;
form, from the plurality of polygons, at least one polygon group, said polygon group comprising polygons with correlated geometric information;
determine, for said polygon group, at least one geometric primitive corresponding to polygons of said polygon group; and
output data representing said geometric primitive as at least a part of a representation of the three-dimensional object.

14. The apparatus of claim 13, comprising a further processor configured to:
determine, for said polygon group, at least one further geometric primitive corresponding to polygons of said polygon group; and
output data representing said geometric primitive as at least a further part of the representation of the three-dimensional object.

15. A non-transitory computer-readable storage medium comprising a set of computer-readable instructions stored thereon which, when executed by at least one processor, cause the at least one processor to process image data comprising data corresponding to a three-dimensional object to:
determine a plurality of polygons, the polygons being representative of the three-dimensional object, wherein each polygon has associated geometric information;
form, from the plurality of polygons, at least one polygon group, said polygon group comprising polygons with correlated geometric information;
determine, for said polygon group, at least one geometric primitive corresponding to polygons of said polygon group; and
output data representing said geometric primitive as at least a part of a representation of the three-dimensional object.

* * * * *